United States Patent Office 2,784,592
Patented Mar. 12, 1957

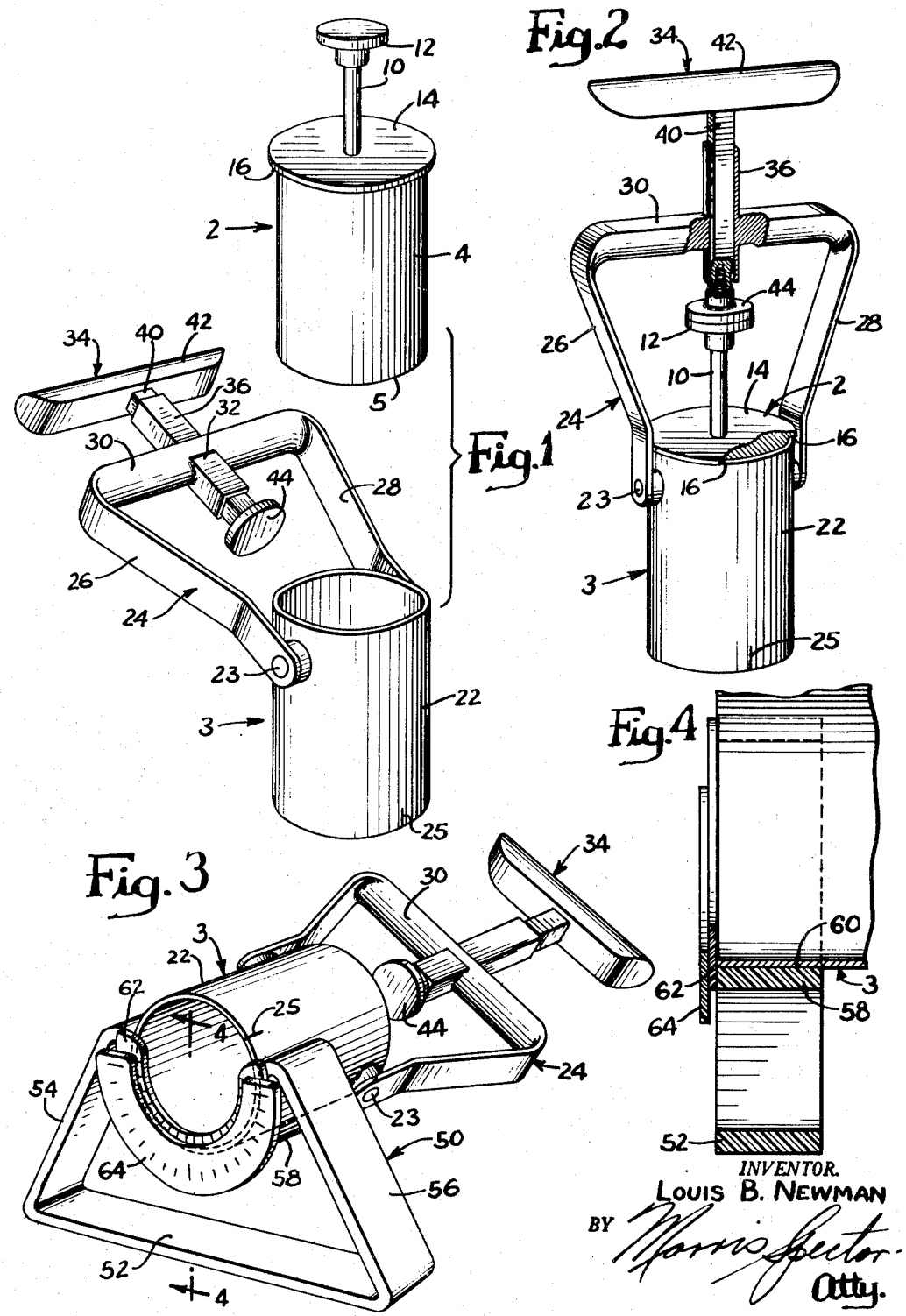

2,784,592

APPARATUS FOR TESTING MUSCLES

Louis B. Newman, Chicago, Ill.

Application August 21, 1953, Serial No. 375,733

8 Claims. (Cl. 73—379)

This application is a continuation in part of my copending application Serial No. 47,777, filed September 4, 1948, now Patent No. 2,680,967.

In my application, above-identified, there is shown a device for measuring muscle strength. This device operates on the principle of measuring the push exerted by the patient. It is one of the objects of the present invention to provide means for adapting the muscle tester of the type of my previous application for grip testing purposes. It is a further object of the present invention to provide an adapter for enabling the use of a muscle tester, such as shown in the above-identified application, to measure supination or pronation.

The adapter in this instance, briefly, includes a casing adapted to receive the body of the aforesaid muscle strength testing device. The casing carries a finger gripping member having an aperture and an actuating member slidable therein. A palm-engaging member is connected to one end of the actuating member and the opposite end of the member is adapted to apply force to the force-receiving contact member of the muscle strength testing device. Force exerted between the fingers and palm move the palm-engaging end of said actuating member toward the said finger gripping member and the force is indicated on a gauge associated with the muscle strength testing device.

A shoulder is provided on the casing of the muscle strength testing device body to prevent relative movement between it and the hand-engaging attachment.

Other features and advantages of the invention will become apparent upon making reference to the specification to follow and the drawings illustrating exemplary embodiments of the invention.

In the drawings:

Fig. 1 is an exploded view of the components making up the grip-testing apparatus of the invention;

Fig. 2 is a perspective view of the apparatus, and partly broken away, of Fig. 1 in assembled condition;

Fig. 3 shows the hand grippable component of Fig. 1 mounted on a cradle support member for use in testing the degree of pronation and supination in a person's arm; and Fig. 4 is a vertical section of the apparatus of Fig. 4 taken along section line 4—4 in the direction of the arrows.

In the various figures, the same reference numerals indicate the same or similar elements throughout.

The grip-testing device of the invention illustrated in the drawings comprises two basic components, namely a force-measuring device 2 and an attachment or adapter 3 therefor which is engageable by the hands of an operator.

The force-measuring device has an outer cylindrical casing 4 which surrounds a force indicating gauge (not shown) at the end 5 thereof. Projecting longitudinally from the opposite end of the force-measuring device 2 is a longitudinally movable rod 10 having a cylindrical disc-shaped contact member 12 on the end thereof. The rod 10 extends through an opening in a plate member 14 on one end of the casing 4. The plate member 14 extends beyond the outer surface of the casing 4 to form a transversely extending, annular shoulder 16. Within the casing 4 is a force-measuring device (not shown), of any well known suitable construction, which indicates the amount of force longitudinally applied to the movable rod 10. Such a device is disclosed in said co-pending application Serial No. 47,777.

The other component of the grip-testing device, namely the attachment or adapter 3, includes a hollow, open-ended, cylindrical casing or frame member 22 which is adapted to be telescoped or fitted about the cylindrical casing 4 of the measuring device 2.

An index mark 25 is provided for reasons to be explained.

When the casing 22 of the attachment 3 is fully telescoped over the force-measuring device, it abuts the shoulder 16 on the casing 4 to prevent relative axial movement therebetween in one direction. In lieu of the shoulder 16, the casing 22 may be provided with a slight inwardly extending curl at its lower end to act as a stop to limit the insertion of the casing 4 into the casing 22. Pivoted to the outside of the casing 22 about pivot pins 23 which extend through aligned, transverse openings in the casing 22 is a yoke member 24. The yoke member 24 is thus pivotable about an axis transversely to the axis of the casing 22, so that the yoke 24 may be pivoted over one open end thereof. The yoke 24 includes side members 26 and 28 which are connected at their outer ends by a cross-arm 30. Extending transversely and in the center of the cross-arm 30 is a hollow, open-ended sleeve 32 having an aperture therein, of square cross-section, which slidably receives the shank 40 of a palm-engaging member, indicated generally by the reference numeral 34. The axis of the aperture in the sleeve 32 is directed toward the contact member 12 of the force-measuring device 2. The shank 40 of the palm-engaging member 34 has a square cross section which is only slightly smaller than the aperture in the sleeve 32. Connected to the outer end of the shank member 40 is a cross bar 42 which is rounded on its outer face to comfortably engage the palm of a hand. Threaded to the opposite end of the shank 40 is a disc-shaped contact member 144 of similar shape to the contact member 12 of the force-measuring device 2.

To assemble the grip-testing device, the yoke member 24 is pivoted to one side of the hollow, cylindrical casing 22, and the gauge end of the casing 4 of the force-measuring device 2 is then placed within the hollow casing 22 of the attachment 3. The yoke member 24 is then pivoted into a position such that the contact member 44 thereof abuts the end of the contact member 12 of the force-measuring device 2, as shown most clearly in Fig. 2. Then the operator grasps the palm-engaging member 34 and cross-arm 30 of the yoke member 24, and the operator then tightly grips the device. In so doing, the longitudinally movable rod 10 applies force to the measuring apparatus within the casing 4 of the measuring device 2 and the force so applied is indicated on the face of the gauge on the end 5 thereof. The shoulder 16 of the measuring device 2 abutting the end of the casing 22 of the attachment 3 prevents relative movement between the parts and enables the ready assembly and disassembly of the components making up the grip testing device.

The attachment 3 may also be utilized in conjunction with a support member, to be described, to provide a device for measuring the degree to which a person may actually rotate his lower arm both in pronation and supination. To this end, the attachment 3 of the grip-testing device just discussed is associated with a cradle support member, generally indicated by the reference numeral 50 (see Figs. 4 and 5). The cradle support member 50 is made of a transparent plastic material and includes a horizontal base plate 52, upstanding side members 54 and 56, and a central cradle or saddle member 58 having a concave upper surface 60, the upper portion of which merges with the top of the side members 54 and 56 respectively. The concave surface 60 conforms in shape to the outside of the casing 22 of the attachment 3 and provides a seat therefor.

Extending inwardly at one end of the concave seat is a transparent flange portion 62, the inner face of which acts as a stop shoulder by abutting the end of the casing 22 of the attachment 3. Secured to the flange 62 is a transparent annular member 64 having suitable index markings thereon for indicating the amount of rotation imparted to the attachment 3.

In operating the device, the attachment 3 is gripped in the same manner as previously described in connection with the grip-testing embodiment of the invention, and the apparatus is rotated on the cradle support member 50. The amount of pronation and supination is indicated by the amount of movement imparted to the adapter or attachment 3 as indicated by the movement of the index mark 25 along the annular scale member 64. Since the flange 62 of the cradle support member and the scale member 64 are both transparent, the index mark 25 is visible from the front of the crade support member for all positions of rotation of the attachment 3.

The present invention thus provides a simple and efficient adapter for testing the strength of one's grip, and which may also be used to measure supination and pronation.

It should be understood that numerous modifications may be made of the specific and preferred embodiments of the invention above described without deviating from the scope of the invention.

I claim:

1. Grip-testing apparatus comprising the combination of a force-measuring device having an outer frame and a force-sensitive means movable therein which includes a force-receiving means accessible from the outside of said device and movable by a force to be measured in a given direction, a pair of opposed members to be grasped between the fingers and palm of a hand, means for securing one of said members to said means for mounting said other member in a position opposite to and for movement toward and away from said one member, said other member having a part extending toward and engaging said force-receiving means to move the same in said direction.

2. The combination comprising a force-measuring unit having a relatively movable force-receiving contact means therein accessible from the outside thereof and movable by a force to be measured in a given direction, an attachment for converting said force-measuring unit to a grip-testing device including a frame releasably receiving said force-measuring unit, said frame carrying a first member to be grasped by the fingers of a hand and a second member to be engaged by the palm of a hand and located opposite said first member, means for fixedly securing one of said members to said frame, means for mounting said other member in a position opposite to and for movement toward and away from said one member, said other member having a part extending toward and engaging said contact means to move the same in said direction, and means for preventing movement of said frame relative to said measuring unit when force is applied between said first and second members.

3. A grip-testing apparatus comprising the combination of a force-measuring device having a force-sensitive member including a force-receiving means accessible from the outside thereof for receiving a force to be measured, a finger-engaging member carried by said force-measuring device and having an aperture therein having an axis directable toward said force-receiving means, means slidably supported in said aperture along said axis thereof and including a palm-engaging member at one end thereof, the other end of said slidably supported means engaging said force-receiving means whereby the force exerted by a hand in moving said palm-engaging member toward said finger-engaging member is transmitted to said force-measuring device.

4. A grip-testing apparatus comprising the combination of a force-measuring device having a movable force-sensitive member including a force-receiving means accessible from the outside thereof for receiving a force to be measured, an arm supported in spaced relation from said device, said arm having an aperture whose axis is directable toward said force-receiving means, actuating means movable within and along the axis of said aperture and having one end thereof adapted to engage and move said force-receiving means, and a transversely extending member on the other end of said actuating means, said arm and said transversely extending member being adapted to be grasped between the palm and fingers of a hand.

5. A grip-testing apparatus comprising the combination of a force-measuring unit having a force-receiving contact member therein movable relative thereto and accessible from the outside thereof for receiving a force to be measured, a yoke carried by said force-measuring unit and having a cross-arm which is adapted to be grasped by the fingers of a hand, said cross-arm having a transversely extending aperture in the central portion thereof having an axis directable toward said contact member, a member movable within and along the axis of said aperture and having one end thereof being adapted to make contact with said contact member, and a palm-engaging member on the other end of said last-mentioned movable member.

6. The combination comprising a force-measuring unit having a housing and a force-receiving contact member movable relative thereto and being accessible from one end thereof and movable by a force to be measured in a given direction, an attachment for converting said force-measuring unit to a grip-testing device including a hollow open-end frame member conforming in shape to said housing and into the open end of which said force-measuring unit is insertable, a yoke pivoted to said frame member and swingable over one end thereof, said yoke having a cross-arm which when the yoke is over said one housing and extends at an angle to said given direction, a second member having a portion extending generally parallel to said cross-arm and engageable with said contact member of said measuring unit to move it in said given direction, means for mounting said second member in a position opposite to and for movement toward and away from said cross-arm along a line transversely thereof, said cross-arm of said yoke and said second member being mounted opposite one another so as to be grasped between the palm and fingers of a hand, and means for preventing movement of said housing of said force-measuring unit relative to said hollow open end frame member in said given direction.

7. An attachment for a force-measuring unit having a housing and a force-receiving contact member at one end thereof for receiving a force to be measured, said attachment comprising a hollow frame member open at least at one end thereof and being adapted to be slid into telescopic relation with said housing with the open end thereof adjacent to said one end thereof, a yoke pivoted to said frame member and swingable over the said open end thereof, said yoke having an aperture, and an actuation member having a shank slidably supported in said aperture and a portion at the other end thereof extending transversely of said shank, the other end of said actuation member being adapted to apply force to said contact member, and said yoke and said transversely extending portion being adapted to be grasped between the palm and fingers of a hand.

8. The combination comprising a force-measuring unit having a housing and a force-receiving contact member movable relative thereto and being accessible from one end thereof and movable by a force to be measured in a given direction, an attachment for converting said force-measuring unit to a grip-testing device including a hollow, open-end frame member conforming in shape to said housing and into the open end of which said force-measuring unit is insertable, a yoke pivoted to said frame member and swingable over one end thereof, said yoke having a cross-arm which when the yoke is over said one end extends at right angles to said given direction, a second member having a portion extending generally parallel to said cross arm, means for mounting the second member for movement toward and from said cross-arm, said second member including means projecting therefrom and engageable with said contact member of said measuring unit to move it in said given direction, said cross-arm of said yoke and said second member being mounted opposite one another to be grasped between the palm and fingers of a hand, and means for preventing movement of said housing of said force-measuring unit relative to said hollow, open-end frame member in said given direction.

References Cited in the file of this patent
UNITED STATES PATENTS

| | | |
|---|---|---|
| 177,251 | Johnson | May 9, 1876 |
| 1,427,496 | Ono | Aug. 29, 1922 |
| 1,623,869 | Giraldi | Apr. 5, 1927 |
| 2,535,787 | Darby | Dec. 26, 1950 |
| 2,645,025 | Weinerman | July 14, 1953 |